Nov. 12, 1946.  R. G. OLSON, JR  2,410,995
SHEET METAL LOCK NUT
Filed July 22, 1944  2 Sheets-Sheet 1

Inventor
Raymond T. Olson, Jr.
By Pattison Wright & Nathan
Attorneys

Nov. 12, 1946.       R. G. OLSON, JR       2,410,995
SHEET METAL LOCK NUT
Filed July 22, 1944       2 Sheets-Sheet 2
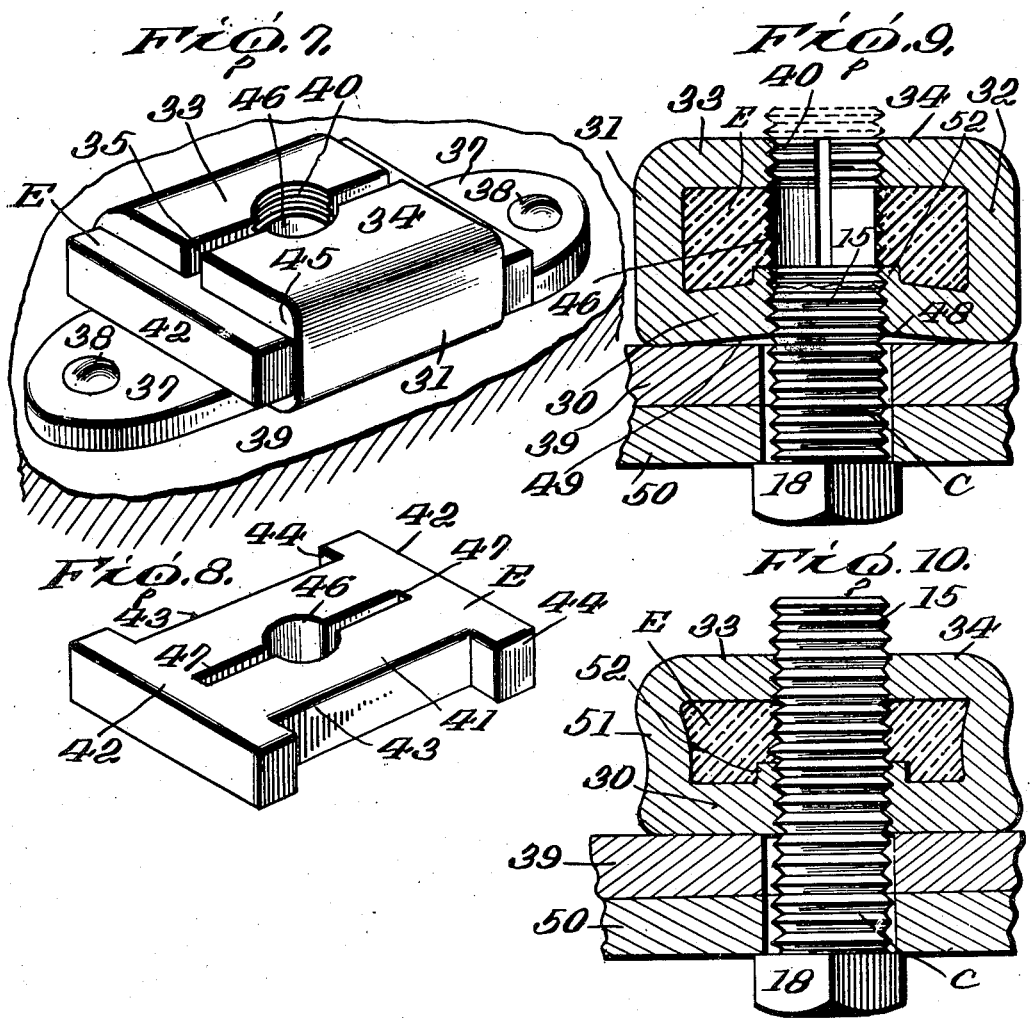
Inventor
Raymond G. Olson, Jr.
By Patterson, Wright & Patterson
Attorneys Patented Nov. 12, 1946

2,410,995

UNITED STATES PATENT OFFICE 2,410,995

SHEET METAL LOCK NUT

Raymond G. Olson, Jr., Chevy Chase, Md.

Application July 22, 1944, Serial No. 546,116

4 Claims. (Cl. 151—7)

This invention pertains to an improved deformable sheet metal lock washer and the method of making the same, and has as its primary object the production of a highly efficient lock nut simply and cheaply.

Having stated the broad objectives of the invention other objects, novel features of construction and improved operation of the device will appear from the following specific description when read in the light of the accompanying drawings illustrating embodiments of lock nuts incorporating the improved inventive concept.

In the drawings:

Fig. 7 is a perspective view of a modified form of lock nut.

Fig. 8 is a perspective view of the insert used with the nut of Fig. 7.

Fig. 9 is a vertical sectional view of the nut appearing in Fig. 7 as applied to a threaded bolt.

Fig. 10 is a vertical sectional view similar to Fig. 9 the nut being illustrated as tightened down to deform the side walls thereof.

Figure 1:
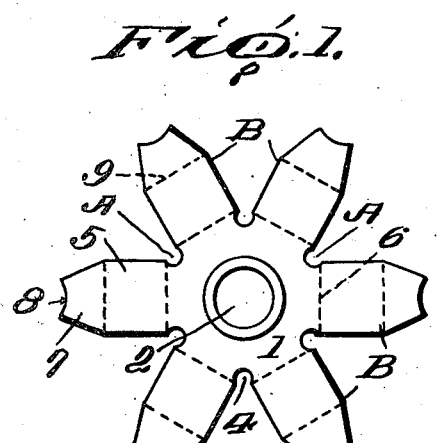
Fig. 1 is a plan view of a sheet metal blank from which a lock nut embodying the present invention is formed.

Describing and having reference to the constructions illustrated in Figs. 1 to 4 inclusive, A designates a stamping from a blank or piece of sheet metal which is of a deformable nature and is susceptible of being bent or deformed without breakage. This stamping comprises a center portion 1 having therein a central opening 2 which is adapted to be internally threaded as indicated at 3 in Fig. 2 of the drawings. A plurality of arms B extend radially from the marginal edges of the center portion of the stamping. These arms are in spaced relationship to one another and the marginal edge of the center portion intermediate the bases of the arms is provided with semi-circular cut-out portions or notches 4. Each arm is provided with a portion 5 adapted to form a vertically disposed wall 5 of the nut by being suitably bent upon a line 6. The outer ends of the arms are provided with a portion 7 and which I term fingers, the outermost ends of which are curved as indicated at 8. The fingers 7 are bent on the line 9 at right angles to the wall portion 5 of the arms to form the nut top and the curved outer ends 8 of the fingers form an opening 10 which is an axial alignment with the opening 2 in the bottom 11 of the nut. The vertical faces of the ends 8 of the fingers are threaded as at 12 for the reception of the same bolt which threaded passes through the bottom bolt opening 2.

The nut formed from the blank A is illustrated as being hexagonal but it is to be understood that it could be of other shapes and is not limited to a six-sided nut. The center portion 1 of the blank forms the nut bottom 11 and this bottom is depressed so that the bottom slants downwardly and outwardly as at 13 from the bolt opening 2 towards the lower ends 14 of the side wall. As a consequence when the nut is threaded upon the shank 15 of a bolt C and positioned against a plate or plates 16 and 17 which are above the bolt head 18 as illustrated in Fig. 3 of the drawings, there is a space 19 between the nut bottom and the plate 16, the purpose of which will be later described.

Figure 2:
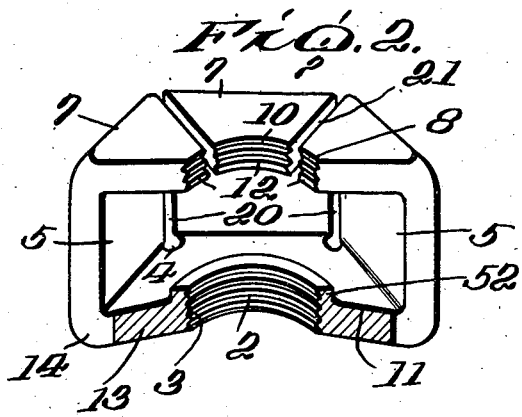
Fig. 2 is a vertical sectional view through a lock nut formed from the blank illustrated in Fig. 1.

By reference to Fig. 2 it will be seen that, in its completed form, the side walls 5 of the nut have attachment with one another only through the nut bottom 11. The vertical edges of each side wall are separated from the opposing edges of an adjacent side wall by a vertically extending slot 20 the lower end of which terminates in the aforementioned semi-circular notch 4 at the peripheral edge of the nut bottom 11. Each of the fingers 7 are similarly independent of one another as their opposing edges are separated by a continuation of the slots 20, which for clarity of understanding are designated 21.

Figure 3:
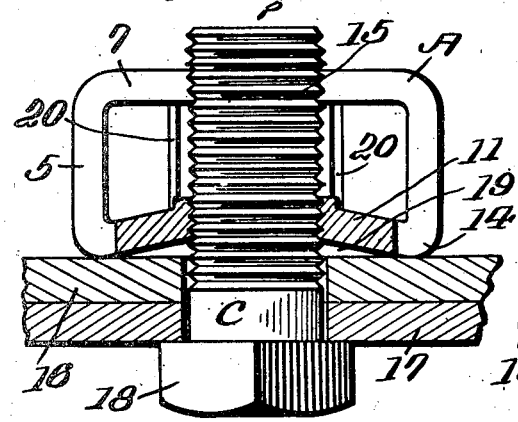
Fig. 3 is a vertical sectional view of the lock nut as applied to a threaded bolt.
Figure 4:
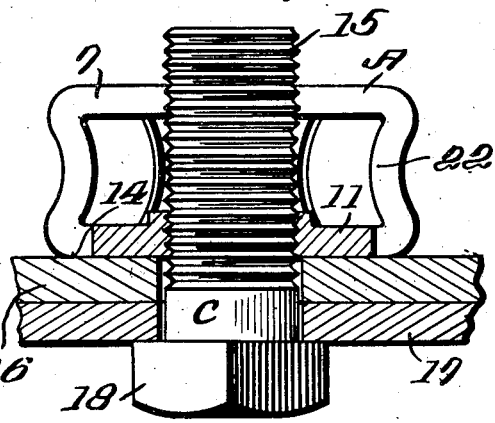
Fig. 4 is a vertical sectional view similar to Fig. 3 the nut having been tightened down to deform the side walls thereof.

A practical application of the nut and the locking action thereof is illustrated in Figs. 3 and 4. When the nut has been turned down to the position illustrated in Fig. 3 of the drawings clamping action is about to be exerted upon the plates or members 16 and 17. The outer peripheral edge 14 of the nut bottom has engaged the uppermost plate 16. A further and final tightening down of the nut results in the action illustrated in Fig. 4 of the drawings. The depressed or concaved bottom 11 of the nut has been straightened or flattened and the entire area of the nut bottom is in engagement with the uppermost plate 16. Straightening the nut bottom causes the side walls 5 of the nut to be deformed inwardly as at 22 and causes the tongues 7 to move horizontally inward toward the shank 15 of the bolt. To the extent that the fingers 7 can move inwardly the size of the upper bolt opening 10 formed by these fingers is reduced. The bolt shank will however permit only a very limited inward movement of the fingers notwithstanding an ever increasing inward pressure caused by tightening down the nut. As the nut is tightened down the ends 8 of the fingers engage the bolt shank under a progressively increasing pressure, which pressure is sufficient to lock the nut against rotation other than through the application of intended manual force. The side walls of the nut remain bowed and exert what can well be expressed as a resilient or spring action which tends at all times to force the ends of the fingers tightly against the bolt shank.

The nut bottom might not under all conditions of use and operation be entirely straightened or flattened out but even when the bottom is only drawn partially down to meet the plate or abutment 16 the locking action will still take place between the nut fingers and the bolt shank and this locking action will differ only in degree from the complete and fullest locking action illustrated in Fig. 4 of the drawings.

Threaded bolts and nuts are manufactured with different degrees of tolerances of clearance in their threads. The present lock nut makes it possible to use threads having large clearance tolerances where heretofore small thread clearance tolerances have had to be used to attain the desired results. The reason for this is of course due to the inward movement and pressure exerted upon the fingers 7 which results in a reduction of the size of the upper nut opening 10. This advantage is also attained by the hereinafter described modified forms of the invention.

Figure 6:
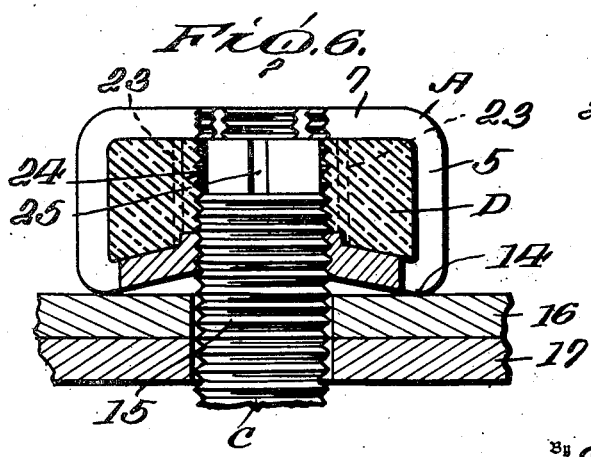
Fig. 6 is a vertical sectional view similar to Fig. 3 with the filler block or disc within the nut.
Figure 5:
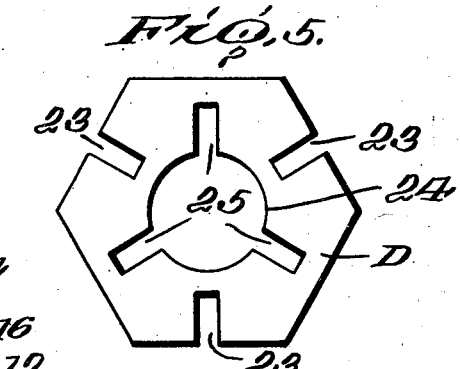
Fig. 5 is a top plan view of a filler block or disc suitable for use with the nut illustrated in Figs. 2 to 4 inclusive.

A modified form of the invention appears in Figs. 5 and 6 of the drawings wherein the nut A is of the identical construction hereinbefore described but a filler block or disc D is used in combination therewith. The filler disc is of the proper size and configuration to fit within the hollow nut and would of course be properly positioned upon the nut blank central portion 1, that is, the nut bottom 11, before the fingers 7 are bent downwardly to extend across and form the top of the nut.

The block or insert is provided at its outer edge with three grooves or channelways 23 and centrally is provided with an opening 24 for the reception of the bolt shank. Three grooves or channelways 25 extend radially from this center opening. When the disc or insert is within the nut the grooves or channelways 23 and 25 are positioned intermediate the slots or channelways 20 and 21 between the nut fingers 7. That is to say, one each of the grooves 23 or 25 will be positioned below a finger. The block or insert is composed of a suitable elastic material and fibre has been found to be very suitable as a material. The central opening 24 of the insert is of a smaller diameter than the bolt openings 2 and 10 of the nut and of smaller diameter than the shank of the bolt, as clearly appears in Fig. 6 of the drawings. The opening 24 of the insert is threaded by the tool which cuts the threads 2 into the side walls of the nut bottom opening 3 and the threads 12 of the finger ends.

In operation this form of the invention is identical to that illustrated in Figs. 3 and 4 of the drawings but there is really a double locking action of the nut to the bolt. There is the locking action obtained by the side walls of the nut being deformed or bowed inwardly as has been described. The second locking action is that exerted by the fibre insert being forced tightly against the bolt shank as a result of the inward bowing of the nut walls. When the nut walls are bowed inwardly the fibre insert is squeezed or compressed and the side wall of the insert bolt receiving opening 24 is forced under pressure against the bolt shank. To the extent that it is possible the diameter of the threaded opening cut through the insert by the bolt is reduced. The pressure engagement between the insert and the bolt shank is maintained as has been pointed out when the operation of the nut illustrated in Figs. 1 to 4 are described. The channel-ways or grooves 23 and 25 in the fibre insert are for the purpose of facilitating the described compression of the insert when the side walls of the nut are deformed inwardly.

From the foregoing description it will be seen that the fingers 7 operate as clamping jaws and that when the fibre insert is used it also tightly clamps the bolt. The nut as a consequence can quite properly be referred to as having a "collet" action.

The nut illustrated in Fig. 7 of the drawings is quite similar to that heretofore described. It comprises a base or bottom 30 and being square or rectangular in configuration has only two side walls 31 and 32. The nut top is formed by a pair of fingers or jaw-like segments 33 and 34 the ends of which stop short of one another as indicated at 35. The nut bottom is provided with a threaded opening and extending oppositely disposed ears 37 provided with openings 38 for the reception of rivets or some other suitable fastening means for securing the nut to a plate 39 or the like. Should it be desirable the ears could be welded to the plate 39.

The opposing and separated ends of the fingers are provided with arc shaped cut-out portions to provide an internally threaded upper bolt opening 40 which is in axial alignment with the bolt opening 36 of the nut bottom.

The nut is made of deformable sheet metal and like the previously described nut can be used with or without an insert disc or block. The nut is illustrated as being used in combination with an insert E composed of fibre or some other suitable resilient material.

The insert has a central portion 41 of the proper size and configuration to fit within and fill the hollow interior of the nut. At each end the insert is provided with a head 42 which has ends extending beyond the sides 43 of the main insert portion 41 to provide shoulders 44 adapted to abut the side edges 45 of the nut walls 31 and 32 and to thereby lock the insert against endwise movement. Cross-wise movement of the insert is prevented by the side walls of the nut. Centrally the insert is provided with an opening 46 for the reception of the shank 15 of the bolt C. The diameter of this opening is less than that of the bolt shank and is threaded when the threads are cut in the bottom opening 36 and the finger or jaw ends. The slots 47 extend from opposite sides of the insert bolt opening 46 and are cut through the entire thickness of the insert.

The nut bottom 30 is depressed to make it concave as indicated at 48 to leave a space 49 between the nut bottom and the plate 39 to which it is attached by the nut ears 37.

From the description heretofore given the operation of the locking action of the nut to prevent rotation of the bolt will be understood. This locking action is illustrated in Fig. 10 of the drawings where it will be seen that as the bolt is rotated to clamp the plate or element 50 against the plate or element 39 the bolt bottom 30 is straightened out so that its entire area engages the upper face of the plate 39. The straightening or flattening of the nut bottom deforms the side walls inwardly so that they are bowed as indicated at 51. This forces the fingers or jaws 33 and 34 inwardly into close engagement with the bolt shank as has been hereinbefore described. This clamping or locking action takes place irrespective of the use or non-use of the fibre insert. When the fibre insert E is used a double locking action is obtained, as has been before explained.

Preferably, although not necessarily, in respect to the nut constructions thus far described the nut bottom is provided on its inner face with a shoulder 52 surrounding the bolt opening. The fibre or resilient inserts D and E in their bottom faces and surrounding their respective bolt openings 24 and 46 are provided with a seat for the reception of the said flange 52. This construction provides for proper and rapid positioning of the insert with its bolt opening in proper alignment with the bolt openings of the nut.

It is to be understood that the grooves in the inserts need not be positioned exactly as illustrated nor need they extend entirely through the inserts. The grooves could also be greater or less in number.

I claim:

1. A device of the character described comprising, a deformable hollow sheet metal nut having a bottom, side walls and a top, said bottom being provided with a threaded opening, said top comprising a plurality of jaws forming a threaded opening in axial alignment with said bottom opening, said openings being for the reception of a threaded bolt, an insert composed of elastic material positioned within said nut and held against rotation therein, said insert being provided with a threaded opening of like diameter to that of the opening in the nut bottom, the opening of the insert being positioned in axial alignment with both of the nut openings, and the bottom of the nut being concaved for the purpose described.

2. A device of the character described comprising, a deformable hollow sheet metal nut having a bottom with side walls at opposite sides thereof, said bottom being concaved and centrally provided with an opening, a top for said nut composed of a pair of jaws extending inwardly from said side walls and having their ends stopping short of one another, the opposing ends of said jaws being provided with threaded portions forming a threaded opening in axial alignment with the threaded opening of said nut bottom, said nut having oppositely positioned open sides, an insert composed of elastic material positioned within said nut and held against rotation therein, said insert engaging the vertical edges of said nut side walls and holding said nut against displacement through the open sides of the nut, and said insert being provided with a threaded opening in axial alignment with and of like diameter to the threaded opening in said nut bottom.

3. A construction as defined in claim 2 wherein, said insert is provided with cut out portions constituting slots extending from and in communication with opposite sides of its opening.

4. A device of the character described comprising, a deformable hollow sheet metal nut having a bottom, side walls and a top, said bottom being provided with a threaded opening, said top comprising a plurality of jaws forming a threaded opening in axial alignment with said bottom opening, said openings being for the reception of a threaded bolt, the bottom of said nut being concaved, an insert composed of elastic material positioned within said nut and held against rotation therein, said insert being provided with an opening of like diameter to that of the opening in the nut bottom, the opening of the insert being positioned in axial alignment with both of the nut openings, said insert having a plurality of side walls, cut-out portions forming slots alternate of said side walls, and a plurality of slots cut in said insert and extending radially from its opening and being positioned intermediate the slots of said side walls.

RAYMOND G. OLSON, Jr.